(12) United States Patent
Westphal et al.

(10) Patent No.: US 7,043,873 B2
(45) Date of Patent: May 16, 2006

(54) INSECT DUAL BAIT STATION

(75) Inventors: Nathan R. Westphal, Racine, WI (US); David O. Brower, Racine, WI (US); Richard E. Keyel, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 10/610,781

(22) Filed: Jul. 1, 2003

(65) Prior Publication Data

US 2005/0000147 A1   Jan. 6, 2005

(51) Int. Cl.
*A01M 1/20*   (2006.01)
(52) U.S. Cl. .......................... 43/131; 43/132.1; 43/124
(58) Field of Classification Search ................ 43/131, 43/132.1, 124; D22/119, 122
See application file for complete search history.

(56) References Cited

U.S. PATENT DOCUMENTS

| 4,747,230 | A | | 5/1988 | Zalesky ........................ 43/121 |
|---|---|---|---|---|
| 4,761,912 | A | | 8/1988 | Dyer et al. .................... 43/121 |
| 4,837,969 | A | * | 6/1989 | Demarest ...................... 43/131 |
| D366,689 | S | * | 1/1996 | Mares et al. ................ D22/122 |
| D410,724 | S | * | 6/1999 | Robles et al. ............... D22/122 |
| 5,960,585 | A | * | 10/1999 | Demarest et al. ............. 43/131 |
| 5,983,558 | A | * | 11/1999 | Las et al. ...................... 43/131 |
| 6,216,384 | B1 | * | 4/2001 | Dickson et al. ................ 43/131 |
| 6,272,791 | B1 | * | 8/2001 | Pleasants ...................... 43/131 |
| 6,343,434 | B1 | * | 2/2002 | Petti ............................. 43/131 |
| 6,532,696 | B1 | * | 3/2003 | Clark et al. ................... 43/131 |
| 6,675,527 | B1 | * | 1/2004 | Barere .......................... 43/114 |
| 6,739,087 | B1 | * | 5/2004 | Weiser et al. ................. 43/121 |

\* cited by examiner

*Primary Examiner*—Michael J. Carone
*Assistant Examiner*—Bret Hayes

(57) ABSTRACT

A bait station for crawling insects includes a base and a cover fastened to the base. The base includes a bait cup bisected by a divider wall so that different baits may be offered to the insects. The cover has a roof that is spaced above and spans over the bait cup so that insects may crawl through doorways formed in the cover to access the bait in the bait cup. A support rib extends downwardly from the roof to engage the bait cup and divider wall to not only provide crush resistance and support for the roof but also to provide a bait retention feature. The support rib may also be configured to serve as a reservoir for water or other insect attractant.

17 Claims, 4 Drawing Sheets

INSECT DUAL BAIT STATION

BACKGROUND OF THE INVENTION

The present invention relates in general to an apparatus for dispensing pesticides, and more particularly to an insect bait station for use with crawling insects.

One of the most popular and effective methods of combating crawling insects is the use of bait which is commonly positioned around or near the insect nest or near where insects gather food. According to their usual food gathering habits, crawling insects will feed on the poisonous bait and take some of the bait with them back to their nests or homes where the bait is shared with other insects, preferably the queen, and as a result, kill a large number of insects.

Various devices typically referred to as insect bait stations have been utilized to present bait to crawling insects, and are well known. Typical insect bait stations have a base with various topographical features used to direct the insects to bait, and a cover that spans those features to create an enclosed bait station. Typical examples of insect bait stations are disclosed in Woodruff et al U.S. Pat. No. 4,563,836; Demarest U.S. Pat. No. 4,837,969; and Demarest et al U.S. Pat. Nos. 5,960,585 and 5,802,761. These and all other patents and publications referred to herein are incorporated herein by reference as if fully set forth. The base of each of the bait stations disclosed in the above patents is formed as a unitary piece of a relatively thin, deformable sheet or film of plastic material that utilizes walls or passageways integrally formed as part of the base to direct insects to the bait. The cover typically spans these structural features without significantly obstructing them.

Woodruff et al U.S. Pat. No. 4,563,836 is an example of this sort of structure. The base of the Woodruff et al bait station includes outer and inner walls with openings in them through which insects can pass. The cover, which spans all of these features formed in the base, is elevated well above the openings formed in the walls which leaves these openings sufficiently unobstructed so an insect can pass through them to the bait.

The bait stations illustrated and described in Demarest U.S. Pat. No. 4,387,969 and Demarest et al U.S. Pat. Nos. 5,906,585 and 5,802,761 utilizes a different approach. In the Demarest patents, the base includes a number of upwardly projecting support features, and the cover provides the exterior sidewalls of the bait station. The cover thus constitutes a shell that fits down over and interacts with the underlying support structures of the base. The doorways by which insects enter the Demarest bait stations are formed not as gaps in or between walls rising from a base, but instead are holes or openings formed in the shell portion of the cover.

The cover of a bait station such as that disclosed in the above three Demarest patents must be capable of bearing a certain amount of top loading without being crushed. Thin walls for the shell are desirable in order to reduce the amount of plastic used in manufacturing, and thus reduce the cost of the bait station. However, thinning the walls of the shell reduces their strength and crush resistance. In order to provide support for the cover, the above three Demarest patents utilize a plurality of upstanding supporting towers extending from the base and located around the bait well. These upstanding towers not only provide crush resistance for the cover, but they interact with the cover to align it to the base during assembly. In addition, these upstanding towers create multiple internal chambers to direct and orient an insect to the bait area once it enters the interior of the bait station.

During use, it is also important to retain the bait in the central well. Otherwise, during handling, the bait may become dislodged from the well which could defeat the overall efficacy of the bait station. One approach to retaining bait is disclosed in Gentile U.S. Pat. No. 4,793,093. This patent illustrates an insect bait station formed of thin plastic material having a base with a central well for receiving bait, and a cover which includes a depending cup-like member which projects inwardly against the top surface of the bait to aid in holding the bait in the central well. The depending cup-like member, however, does not provide any crush resistance since it bears directly against the bait in the well. Instead, crush resistance is provided by sidewalls which rest upon the top surface of a peripheral wall formed by the base. Another patent illustrating a similar retaining mechanism is Wefler U.S. Pat. No. 5,548,922. Wefler illustrates a recessed portion in the cover that includes a hollow pillar which holds a wick in position in the central well of the base so that insects have access to liquid bait presented by the wick. Again, however, the central pillar does not provide any support for the cover, but merely holds the wick in position.

S. C. Johnson & Son, Inc. has sold in the United States two crawling insect bait stations having divided bait wells. The first, sold as Raid® Double Control Ant Baits, is a bait station comparable to the bait station shown in FIGS. 1 and 2 of Demarest, U.S. Pat. No. 4,837,969, except that the well 18 is somewhat enlarged and a divider meanders across the well 18, dividing it into two subsections, each of which contains a bait differing from the bait in the other subsection. The cover 30 has a central depression that approaches and under finger pressure touches the divider, serving to help retain the bait in the subsections. However, the central depression does not reach or contact the edges of the bait well 18.

The second S. C. Johnson & Son, Inc. bait station referred to has been sold as Raid® Double Control Small Roach Baits, a bait station comparable to the bait station shown in FIGS. 1 and 2 of Demarest, U.S. Pat. No. 5,960,585, except that a divider extends across the bait cup 16, parallel to the longitudinal axis of the bait station, dividing it into two subsections, each of which contains a bait differing from the bait in the other subsection. However, no portion of the cover 14 contacts the bait cup wall 20, the cover 14 being supported by other means.

An ongoing need still exists in the art for a bait station for crawling insects that utilizes a cover made of thin plastic material that spans a base, yet is provided with adequate strength and crush resistance while at the same time aids in bait retention.

SUMMARY OF THE INVENTION

A bait station for crawling insects includes a base and a cover fastened to the base. The base includes a bait cup for offering bait to a target insect. The cover has a roof that is spaced above and spans over the bait cup so that insects may crawl through a plurality of doorways formed in the cover to access the bait in the bait cup. A support rib extends downwardly from the roof to engage the bait cup to not only provide crush resistance and support for the roof but also to provide a bait retention feature. The support rib may also be configured to serve as a reservoir for water or other insect attractant.

In one embodiment, the bait station comprises a base and a cover fastened to the base wherein both the base and cover are formed independently as a unitary component of a relatively thin, deformable sheet or film of plastic material. The base includes a bait cup for containing bait and having a central floor surrounded by an insect-climbable bait cup wall extending upwardly from the central floor, and a divider wall extending across the central floor which divides the bait cup into at least two compartments for receiving one or more baits. The base further includes a peripheral flange, a peripheral floor distal and adjacent to the bait cup, and a plurality of upstanding support members extending upwardly from the peripheral floor, at least one of the support members having a roof detent formed therein.

The cover includes a shell having a shell wall rising from and enclosing the peripheral floor of the base, at least on doorway formed in the shell wall having a size sufficient to admit a target insect, and a roof spanning the space encompassed by the shell wall and being supported by the upstanding support members and further being sufficiently spaced above the bait cup wall so that a target insect may crawl through the doorway and over the bait cup wall to access bait contained within the bait cup. The cover further includes a locator rib formed in the roof and engaged with the roof detent of the upstanding support member to stabilize movement of the roof with respect to the upstanding support member, a support rib extending downwardly from the roof to engage the bait cup wall and support the roof, and a cover flange attached to the peripheral flange of the base.

Preferably, the divider wall bisects the bait cup so that two different baits may be offered to insects simultaneously to thereby increase the efficacy and acceptance of the insecticide provided within the bait formulations. Also, it is preferred that the support rib extends transversely with respect to the divider wall and a sufficient distance across the roof to not only engage the divider wall but also both sides of the bait cup wall to provide structural continuity between the base and cover.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
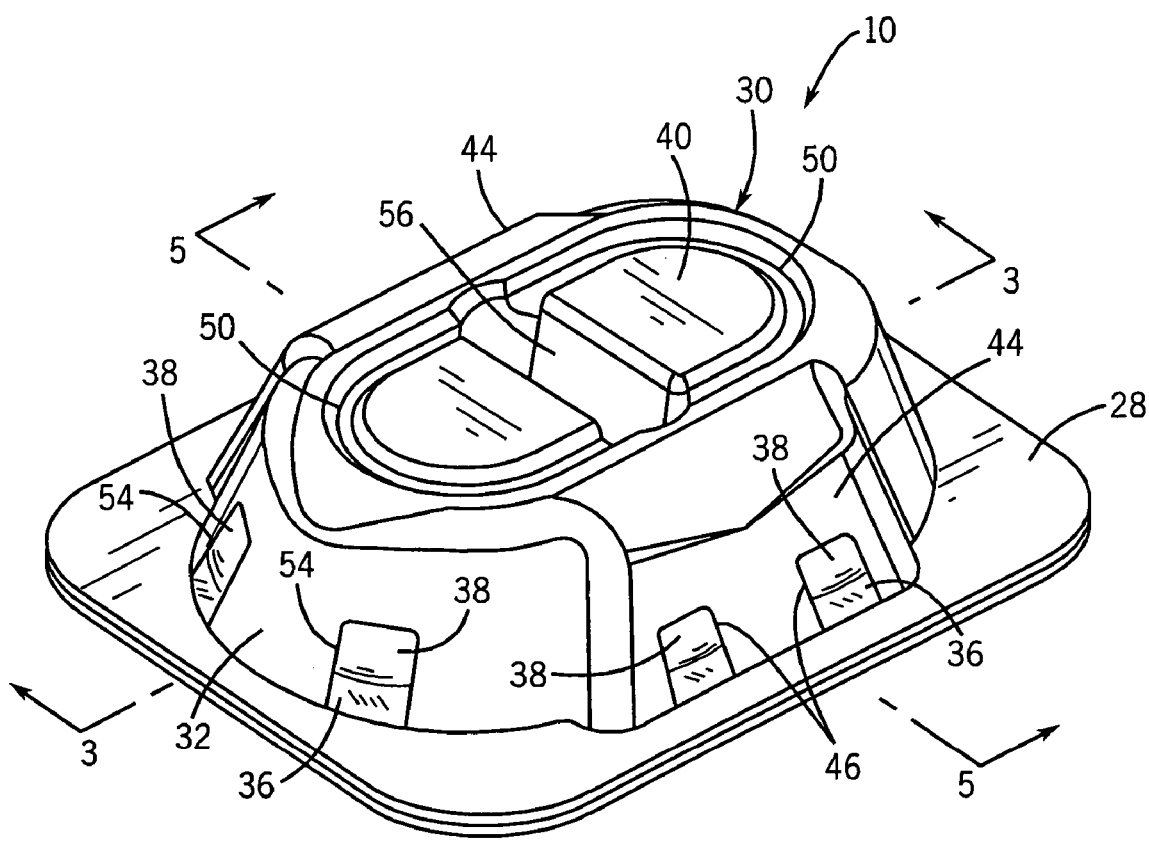
FIG. 1 is a front perspective view of an insect dual bait station constructed in accordance with the principles of the present invention.

Referring now to the drawings, FIGS. 1–6 illustrate an insect dual bait station generally designated by the numeral 10 constructed in accordance with the present invention. The dual bait station 10 includes two major components, namely, a base generally designated by the numeral 12, and a cover generally designated by the numeral 14. The insect bait station 10 is intended for use with crawling insects such as, but not limited to, cockroaches, ants, spiders and the like. Also, as used herein, the term "bait" refers to any of a number of solid bait toxicant formulations well known in the art, preferably one having a delayed kill action. An example of a suitable bait toxicant comprises: boric acid (at 2% by weight), sugar/corn sweetener (at 15% by weight), preservatives such as that commonly sold under the trademark "Legend MK" (at 0.2% by weight), carageenan (at 1.2% by weight), and water (at 81.6% by weight).

The bait station 10 has a base 12 and cover 14, the cover being fastened to the base. The base 12 and cover 14 each are unitarily formed, preferably from a thin sheet or film of plastic such as polyvinylchloride by thermoforming, injection molding, or any other means familiar to those skilled in the art for making thin walled plastic parts.

Figure 2:
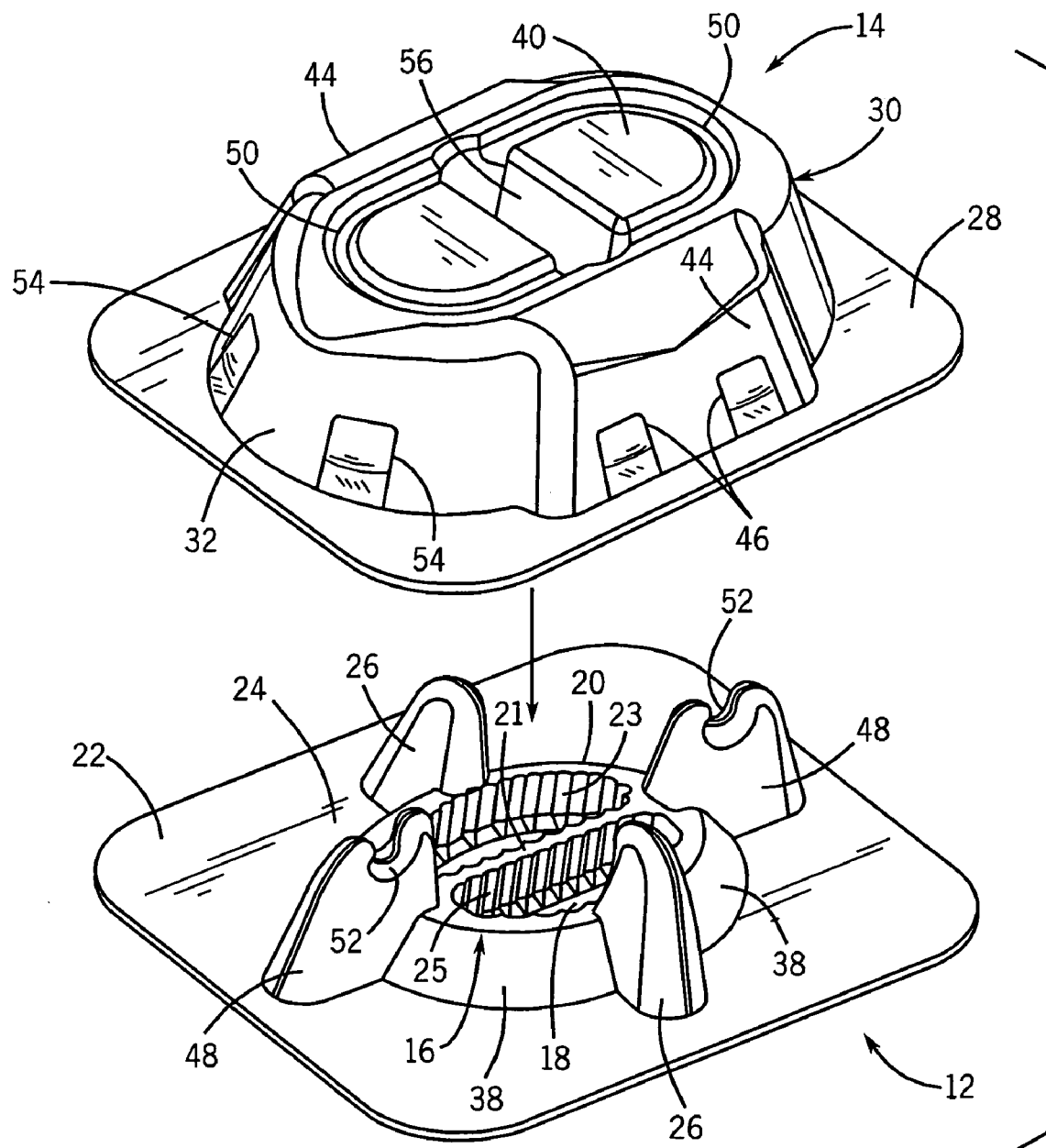
FIG. 2 is an exploded view of the insect dual bait station of FIG. 1 showing the base and the cover.
Figure 3:
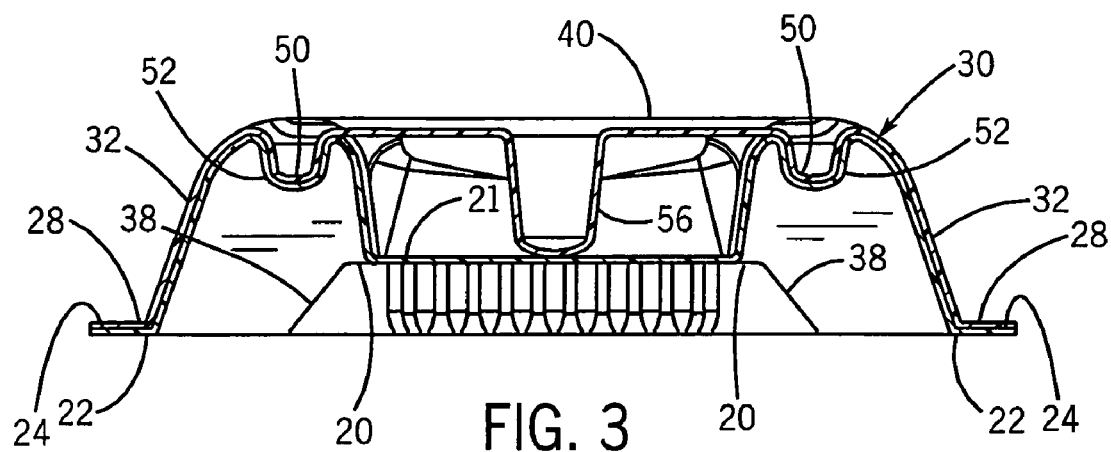
FIG. 3 is a cross-sectional side view of the insect dual bait station of FIG. 1 taken along the plane of the lines 3—3 in FIG. 1.
Figure 4:
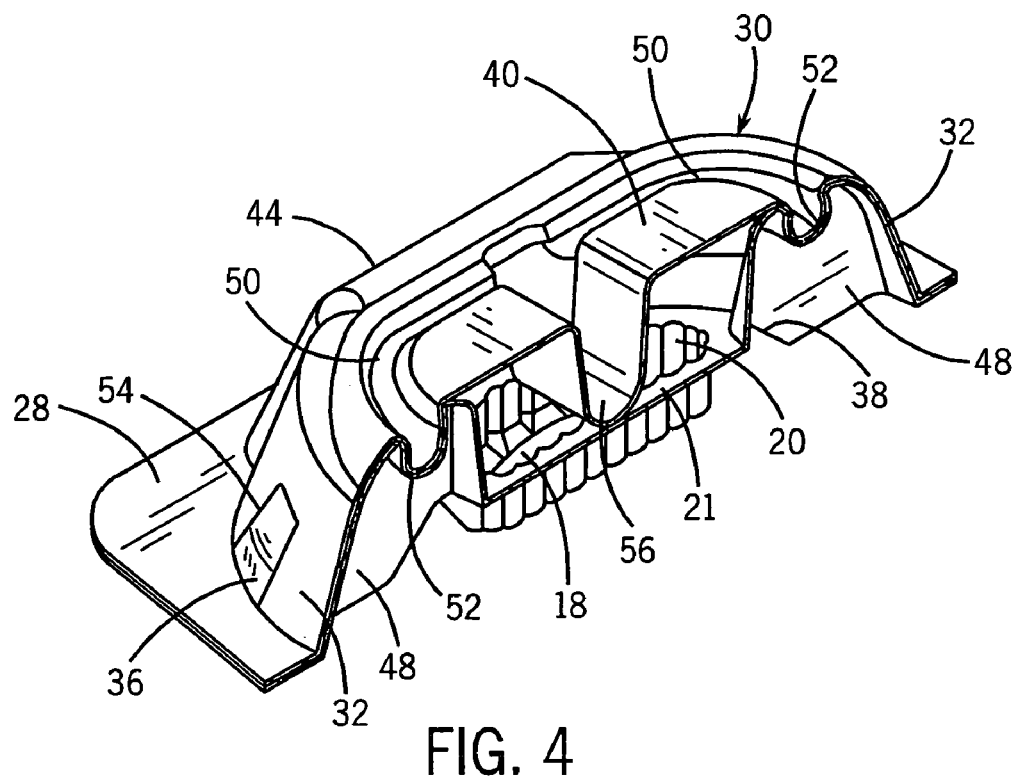
FIG. 4 is a cross-sectional perspective view of the insect dual bait station of FIG. 1 taken along the plane of the lines 3—3 in FIG. 1.
Figure 5:
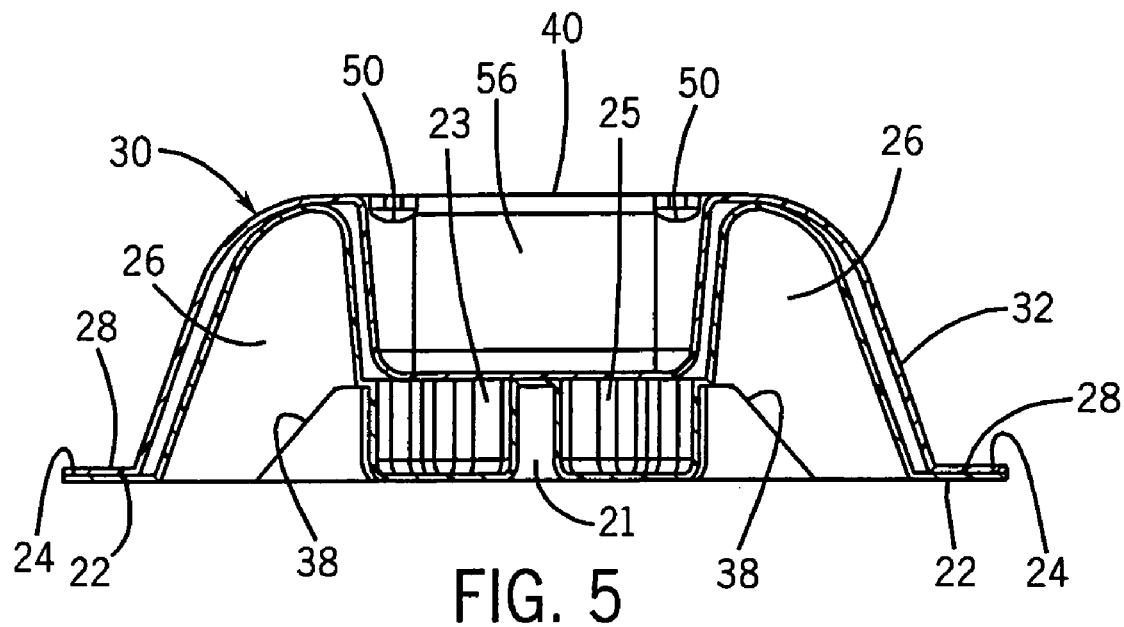
FIG. 5 is a cross-sectional side view of the insect dual bait station of FIG. 1 taken along the plane of the lines 5—5 in FIG. 1.
Figure 6:
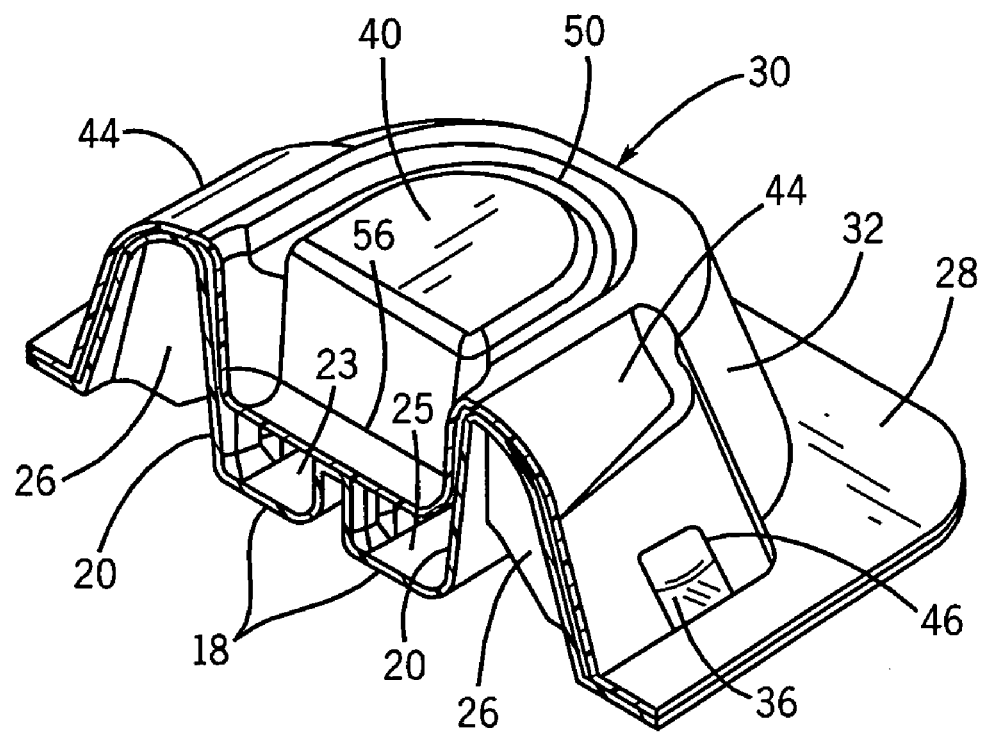
FIG. 6 is a cross-sectional perspective view of the insect dual bait station of FIG. 1 taken along the plane of the lines 5—5 in FIG. 1.

As best seen in FIG. 2, the base 12 includes a bait cup 16. The bait cup 16 is provided as an oval-shaped container for a selected bait (not shown). As noted above, a variety of baits suitable for use within the bait station 10 are well known to those skilled in the art and commonly include an insecticide or other poisonous material to which it is desired to expose a targeted insect. As illustrated, the bait cup 16 has a central flat floor 18. The central floor 18 is surrounded by an insect climbable bait cup wall 20. The bait cup wall 20 extends upwardly from the central floor 18 for a selected distance. A divider wall 21 extends longitudinally across the floor 18 and thereby divides the bait cup 16 into at least two compartments 23, 25 for receiving the same or different bait. Preferably, wall 21 bisects bait cup 16 into two equal compartments 23, 25. The base 12 further includes a peripheral flange 22. A portion of the peripheral flange 22 that is distal and adjacent to the bait cup 16 is designated as a peripheral floor 24. The width of the peripheral floor 24 outwardly from the bait cup 16 is defined below.

A pair of side supports 26 extend upwardly from base 12 to a point above the uppermost extension of the bait cup wall 20. As shown best in FIG. 2, there is one side support 26 located on each opposite side of bait cup 16. Each side support 26 extends longitudinally in a direction transverse to the bait cup wall 20. Side supports 26 function to support cover 14 as will hereinafter be described, and their orientation with respect to bait cup wall 20 also has the advantage of introducing lateral undulations in the shell wall 32 that increase its ability to resist compressive forces from above.

The bait cup wall 20 may define any convenient, closed geometric shape, including but not limited to a circle, an oval (as shown in the drawings), a polygon, or other regular or irregular curved shape; a square, rectangle, triangle or other straight-sided shape; or any shape having a combination of straight and curved sides. Side supports 26 can also take on alternate orientations. For example, side supports 26 could also extend longitudinally generally along the sides of bait cup wall 20. Side supports 26 can be considered to extend longitudinally generally along sides of the bait cup wall 20 if the side supports 26 extend longitudinally in a direction that includes or varies between being equidistant from the bait cup wall, curving toward the bait cup wall, and being parallel to and tangent to the bait cup wall, such tangent being taken as a point within the length or preferably at the middle of the side support. Thus, alternate orientations of the side supports 26 are contemplated herein.

The cover 14 has a cover flange 28. The cover flange 28 is fixedly attached to the peripheral flange 22 of the base 12. Such attachment may be by the use of glue, thermoplastic welding, riveting, stapling, or other mechanical means, or any other convenient means of attachment selected from examples well known to those skilled in the art.

The cover 14 includes a shell 30. The shell 30 includes a substantially oval-shaped outer shell wall 32. The shell wall 32 rises from the level of and encloses the peripheral floor 24 of the base 12. The peripheral floor 24 thus extends between the bait cup wall 20 and the shell wall 32. The shell wall 32 preferably is spaced from the bait cup wall 20, and thereby defines a walkway therebetween that has a walkway floor 36 that includes the peripheral floor 24 of the base 12. The walkway floor 36 is best seen in FIG. 1. The walkway floor 36 has a width sufficient to allow targeted insects to walk thereon. The walkway floor 36 may either be flat or may include other contours bridging from the level of the peripheral flange 22 of the base toward the level of the uppermost extension of the bait cup wall 20. For example, in the embodiment shown in FIG. 2, a ramp 38 is included that extends from a portion of the peripheral wall 24 that is at the level of the peripheral flange 22 upwardly to the uppermost extension of the bait cup wall 20. So long as the bait cup wall 20 remains climbable to the targeted insects, the exact configuration of the walkway floor 36 may be varied. However, the ramp 38 is a preferred configuration in that it braces and thus imparts desirable rigidity to the bait cup wall 20.

The shell 30 also includes a substantially flat roof 40. The roof 40 spans and encloses the space encompassed by the shell wall 32 and is unitarily integral and continuous therewith. The roof 40 is supported by the side supports 26 and, because of the longitudinal extension of the side supports, it receives support for an extended distance rather than just an isolated point. The roof 40 is sufficiently spaced above the uppermost extension of the bait cup wall 20 that targeted insects may crawl over the bait cup wall 20 to reach any bait contained within the bait cup 16.

As best illustrated in FIGS. 1 and 2, a pair of adjacent side doorways 46 are provided in the undulated portions of the sides of shell wall 32 that constitutes an outwardly projecting antechamber shell wall 44. The doorways 46 open into walkway 34 and are of a size sufficient to admit a targeted insect. The antechamber doorways 46 are so located in relation to the side supports 26 that straight line access to the bait cup 16 is permitted on either side of the side supports 26. With the side supports 26 so oriented, the antechamber shell wall 44 provides sufficient space to enable a targeted insect to enter the bait station 10 through the doorways 46, be directed by the side supports 26 to the walkway 34, and thus gain access to any bait contained in the bait cup 16 by climbing the bait cup wall 20.

As illustrated best in FIG. 2, there are two side supports 26. The two side supports 26 are located on opposite sides of the bait cup 16. The exact position and number of the side supports 26 with respect to the bait cup wall 20 can be varied to produce alternate embodiments of the bait station 10 that fall within the scope and breadth of the present invention. Thus, in the embodiment shown in FIGS. 1–6, two side supports 26 are located immediately beside the bait cup 16 and extend upwardly from the bait cup wall 20 so that the surfaces of the side supports 26 that are presented toward the bait cup 16 are substantially continuous with the inner surface of the bait cup wall 20. However, a side support 26 may be at a location either within, at the side of, or exterior to and separated from the bait cup 16 if desired. The arrangement illustrated for side supports 26 provide desirable resistance to crushing from a force applied to the support from above. In addition, the arrangement illustrated is preferred because the location of side supports 26 reduces the distance that the roof 40 must span without support from beneath.

As shown best in FIG. 2, additional support for roof 40 is provided by two end supports 48 which extend longitudinally in a direction transverse to bait cup wall 20. The end supports 48 are located in opposed relation, at opposite ends of bait cup 16 and spaced between the side supports 26 about the periphery of bait cup wall 20 so that the roof 40 is supportable by the end supports 48 as well as the side supports 26. As with the side supports 26, the end supports 48 may be placed at any desirable location with respect to the bait cup wall 20, whether located immediately adjacent to the margin of the bait cup 16, as is shown in the drawings, or located within or at a position removed outwardly from the margin of the bait cup 16. The advantages of the position shown for the end supports 48 correspond to that discussed with respect to the positions shown and described above for the side supports 26.

As a further aid in achieving a dimensionally stable insect bait station 10, the roof 40 preferably includes an oval-shaped locator rib 50 which extends downwardly and is located immediately adjacent to the inner surfaces of the side supports 26 to restrict lateral movement of the roof 40 with respect to the side supports 26. The relationship of the locator rib 50 to side supports 26 is shown best in FIG. 5. If the bait station 10 includes more than two side supports 26, it is also preferred that the locator rib 50 be so designed as to pass immediately adjacent to and engageable with the inner surfaces of each side support 26 so that, as noted above, it can restrict lateral movement of the roof 40 with respect to these structures.

In the embodiment shown in the drawings, the locator rib 50 is a single, continuous, downwardly extending channel formed in the roof 40. However, to fall within the scope and spirit of the present invention, it is only required that the locator rib 50 be located immediately adjacent to surfaces of one or more side supports 26 or end supports 48. Thus, the locator rib 50 may be the continuous channel shown on the drawings, or, alternately, may be one or more projections extending preferably downwardly from the roof 40 at the location specified. Alternately, locator rib 50 may extend upwardly, presenting a downwardly open groove toward the interior of the bait station 10, and then portions of the side supports 26 or end supports 48 may extend upwardly to engage the interior of the groove. Thus, the term "locator rib" should be understood to encompass numerous alternative structures.

In addition to restricting lateral movement of the roof 40, locator rib 50 also restricts longitudinal movement of roof 40, and further provides an automatic centering effect, directly locating the cover 14 (and more specifically the shell 30), over the base 12 (and more specifically the side supports 26 and end supports 48) during assembly. It should also be noted that end supports 48 each include a roof detent 52 adapted to receive the locator rib 50 in mating relation. As illustrated, locator rib 50 extends downwardly and roof detent 52 is an upwardly open notch adapted to receive the locator rib 50. This arrangement firmly anchors the roof 40 and restricts its longitudinal movement with respect to end supports 46. It should be noted that locator rib 50 also functions as a stabilizing beam, further stiffening the roof 40.

In order to provide further crush resistance and strength to cover 14 as well as a unique bait retention feature, cover 14 also has a support rib 56 extending downwardly from the roof 40 to engage both the bait cup wall 20 as well as the divider wall 21. Support rib 56 extends laterally across the roof 40, and as seen best in FIGS. 3 and 4, has a substantially U-shaped cross-sectional configuration. As seen best in FIGS. 4 and 6, rib 56 extends transversely with respect to divider wall 21 and is located so that it substantially bisects the length of divider wall 21. As shown best in FIGS. 5 and 6, the opposite lateral sides of rib 56 are positioned closely adjacent to the inner surfaces of side supports 26 to provide further lateral stability for roof 40. The interaction of the bottom of rib 56 with the tops of divider wall 21 and opposite sides of bait cup wall 20 provides structural continuity between the base 12 and cover 14, and provides retention of the baits within the compartments 23 and 25. In addition, due to its U-shape, rib 56 provides a reservoir for receiving water or other insect attractants. It should also be noted that although rib 56 is illustrated as being U-shaped, it may also be configured to have other shapes, e.g. V-shaped, square, rectangular or the like, as would be well known to those skilled in this art.

As was previously noted, the bait cup 16 may be round, oval, square or any other convenient geometric figure having curved or straight sides, or a mixture of curves and straight sides. Similarly, the shell 30 may assume any of the variations in shape just referred to. The bait cup 16 and shell 30 may have generally concentric and corresponding shapes or they may have different shapes. By way of example, a generally oval or oblong shell may be used with a round bait cup or with an oval or oblong bait cup, or vice versa.

Additional doorways communicating with the walkway 34 and large enough to admit targeted insects may be included at convenient locations in the shell wall 32 that are not obstructed by a side support 26 or an end support 48. For example, FIGS. 1 and 2 illustrate two larger doorways 54 at opposite ends of shell wall 32. Two doorways 54 are located adjacent one another in what might be considered to be "front" of the bait station 10 while two other doorways (not shown) would be located in what might be considered the "rear" of bait station 10. With respect to doorways 54 an insect entering the bait station 10 therethrough may be directed by end supports 48 to the walkway 34 and thereby proceed directly to climb the bait cup wall 20 with no need to move laterally to avoid an obstructing structure. Similarly, it is not strictly required that each antechamber wall 44 be provided with a pair of antechamber or side doorways 46, if sufficient doorways are located elsewhere in the shell wall 32. Thus, the number, size and location of the doorways can vary depending upon the bait being used, the insects to be killed, and the desired efficacy of bait station 10.

INDUSTRIAL APPLICATION

A bait station is disclosed for offering bait to crawling insects for their practical control, together with the means of its manufacture.

What is claimed is:

1. A bait station for offering bait to a target insect, comprising:
   a) a base including a bait cup for containing bait, said bait cup having a central floor surrounded by an insect-climbable bait cup wall extending upwardly from the central floor to an upper end and a peripheral flange coplanar with said central floor and extending outwardly from said bait cup wall, said peripheral flange including a peripheral floor adjacent to the bait cup wall; and
   b) a cover fastened to the base, said cover including:
      (i) a shell having an upstanding shell wall rising from said peripheral flange and spaced outwardly from and surrounding said bait cup wall so that said peripheral floor extends between said bait cup wall and said shell wall to define a walkway therebetween, and a roof spanning the space encompassed by the shell wall,
      (ii) at least one doorway formed in the shell wall, the doorway having a size sufficient to admit a target insect,
      (iii) said roof being sufficiently spaced above the bait cup wall so that a target insect may crawl through the doorway onto said walkway and over the upper end of the bait cup wall to access bait contained within the bait cup,
      (iv) a support rib extending downwardly from the roof said support rib having a lower end that directly engages the upper end of the bait cup wall to support the roof, and
      (v) a cover flange extending outwardly from said shell wall and attached to said peripheral flange of said base.

2. The bait station of claim 1 further including a divider wall extending upwardly from the central floor to an upper end and extending across the central floor which divides the bait cup into at least two compartments for receiving bait.

3. The bait station of claim 2 wherein said divider wall bisects the bait cup.

4. The bait station of claim 2 wherein said support rib extends transversely with respect to the divider wall.

5. The bait station of claim 4 wherein the lower end of said support rib directly engages both the upper end of the bait cup wall and the upper end of the divider wall.

6. The bait station of claim 1 further including a plurality of upstanding support members extending upwardly from the base, said roof being supported by the upstanding support members.

7. The bait station of claim 6 wherein said plurality of upstanding support members are spaced from each other about the periphery of the bait cup wall.

8. The bait station of claim 7 wherein said plurality of upstanding support members extend longitudinally in a direction transverse to the bait cup wall.

9. The bait station of claim 6 wherein at least one of said upstanding support members has a roof detent formed therein, and said cover further includes a locator rib formed in the roof engaged with the roof detent to stabilize movement of the roof with respect to the upstanding support members.

10. A bait station for offering bait to a target insect, comprising:
    a) a base including
       (i) a bait cup for containing bait, said bait cup having a central floor surrounded by an insect-climbable bait cup wall extending upwardly from the central floor to an upper end and a divider wall extending upwardly from the central floor to an upper end and extending across the central floor which divides the bait cup into at least two compartments for receiving one or more baits;
       (ii) a peripheral flange coplanar with said central floor and extending outwardly from said bait cup wall, said peripheral flange including a peripheral floor distal and adjacent to the bait cup; and (iii) a plurality of upstanding support members extending upwardly from the peripheral floor, at least one of said support members having a roof detent formed therein; and b) a cover fastened to the base, said cover including
   (i) a shell having an upstanding shell wall rising from said peripheral flange and spaced outwardly from and surrounding said bait cup wall so that said peripheral floor extends between said bait cup wall and said shell wall to define a walkway therebetween, and a roof spanning the space encompassed by the shell wall, at least one doorway formed in the shell wall, the doorway having a size sufficient to admit a target insect, said roof being supported by the upstanding support members and being sufficiently spaced above the bait cup wall so that a target insect may crawl through the doorway onto said walkway and over the upper end of the bait cup wall to access bait contained within the bait cup, a locator rib formed in the roof engaged with said roof detent of the upstanding support member to stabilize movement of the roof with respect to the upstanding support member, and a support rib extending downwardly from the roof, said support rib having a lower end that directly engages the upper end of the bait cup wall to support the roof; and
   (ii) a cover flange extending outwardly from said shell wall and attached to the peripheral flange of the base.

11. The bait station of claim 10 wherein said divider wall bisects said bait cup.

12. The bait station of claim 10 wherein said support rib extends transversely with respect to the divider wall.

13. The bait station of claim 12 wherein the lower end of said support rib directly engages both the upper end of the bait cup wall and the upper end of the divider wall.

14. The bait station of claim 10 wherein the roof detent is upwardly open and the locator rib extends downwardly from the roof.

15. The bait station of claim 10 wherein said plurality of support members include a pair of end support members disposed at opposite ends of the bait cup wall, each end support member having a roof detent formed therein engageable with said locator rib.

16. The bait station of claim 15 wherein said plurality of support members further includes a pair of side support members disposed at opposite sides of the bait cup wall and between said end support members.

17. The bait station of claim 16 wherein the end support members and side support members extend longitudinally in a direction transverse to the bait cup wall.

* * * * *